United States Patent
Dewald, Jr. et al.

[11] Patent Number: 6,108,983
[45] Date of Patent: Aug. 29, 2000

[54] SLIDE OUT ROOM WITH FLUSH FLOOR

[76] Inventors: James E. Dewald, Jr.; Martin P. McManus; Patrick W. McManus, all of 1023 W. Eighth St., P.O. Box 703, Mishawaka, Ind. 46544

[21] Appl. No.: 08/992,308

[22] Filed: Dec. 17, 1997

Related U.S. Application Data

[63] Continuation-in-part of application No. 08/753,103, Nov. 20, 1996, abandoned.
[60] Provisional application No. 60/015,574, Nov. 22, 1995.

[51] Int. Cl.⁷ ........................................................ B60P 3/34
[52] U.S. Cl. .................... 52/67; 296/26.13; 296/26.14; 296/171; 296/175
[58] Field of Search .................... 52/67, 143; 296/26.02, 296/26.12, 26.13, 26.14, 165, 171, 172, 173, 175, 176

[56] References Cited

U.S. PATENT DOCUMENTS

| | | |
|---|---|---|
| 2,484,312 | 10/1949 | Rebours . |
| 2,831,722 | 4/1958 | Hanson et al. . |
| 2,913,775 | 11/1959 | Sailor . |
| 3,106,750 | 10/1963 | Jarman .......................................... 52/67 |
| 3,181,910 | 5/1965 | Thomas ......................................... 52/67 |
| 3,271,065 | 9/1966 | Scuris . |
| 4,930,837 | 6/1990 | Marsh et al. . |
| 5,090,749 | 2/1992 | Lee .......................................... 296/171 |
| 5,237,782 | 8/1993 | Cooper . |
| 5,491,933 | 2/1996 | Miller et al. ................................. 52/67 |
| 5,577,351 | 11/1996 | Dewald, Jr. et al. ........................ 52/67 |
| 5,620,224 | 4/1997 | DiBiagio et al. ..................... 296/26.13 |
| 5,706,612 | 1/1998 | Tillett ......................................... 52/67 |
| 5,902,001 | 5/1999 | Schneider ............................. 296/26.13 |
| 5,984,396 | 11/1999 | Schneider ............................. 296/26.14 |

FOREIGN PATENT DOCUMENTS

| | | |
|---|---|---|
| 83317 | 7/1983 | European Pat. Off. . |
| 1570553 | 6/1969 | France . |

*Primary Examiner*—Laura A. Callo
*Attorney, Agent, or Firm*—Baker & Daniels

[57] ABSTRACT

A retractable room for mobile living quarters includes a floor which slides along the floor of the main living quarter when the retractable room is retracted therein, but drops into a position flush with the main floor when the retractable room is extended into its extended position. A linkage operates a riser mechanism to raise and lower the floors as the room is extended and retracted. The riser mechanism is operated by a lever which pivots in response to movement of the floor to a predetermined position relative to the main living quarters.

17 Claims, 14 Drawing Sheets

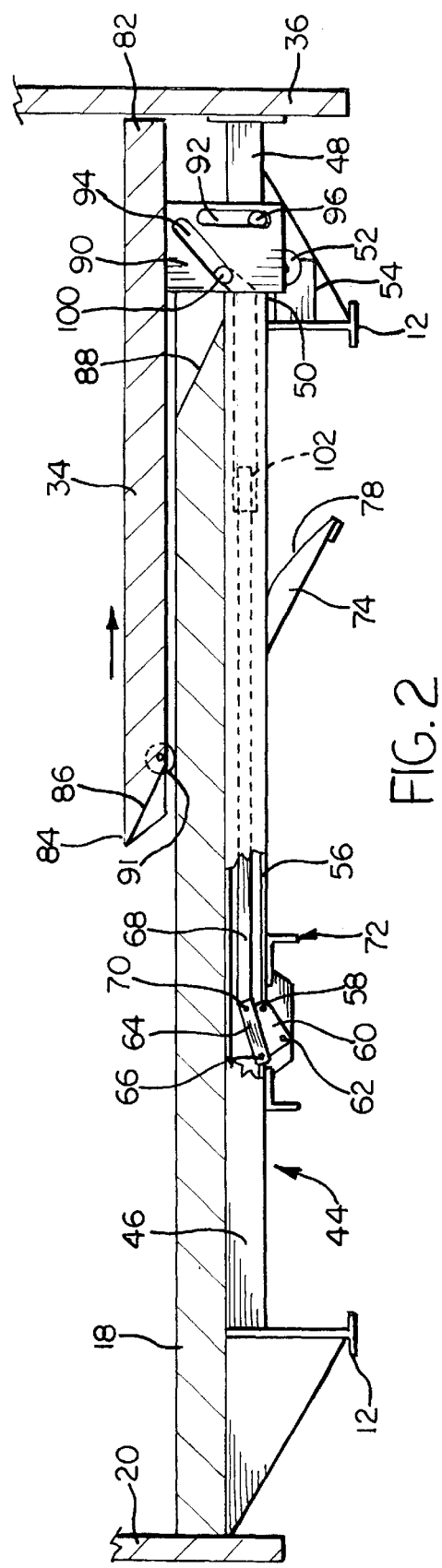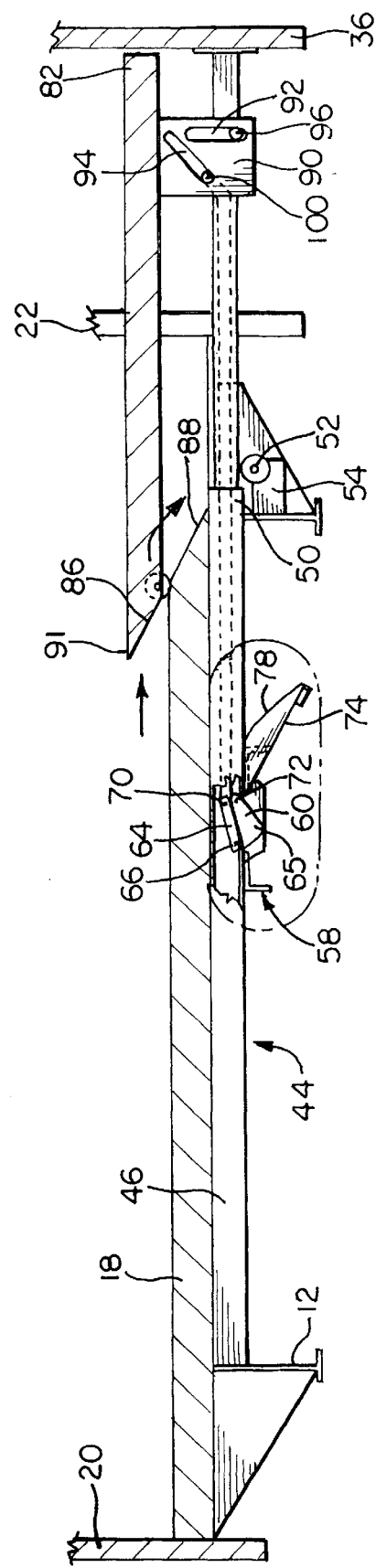

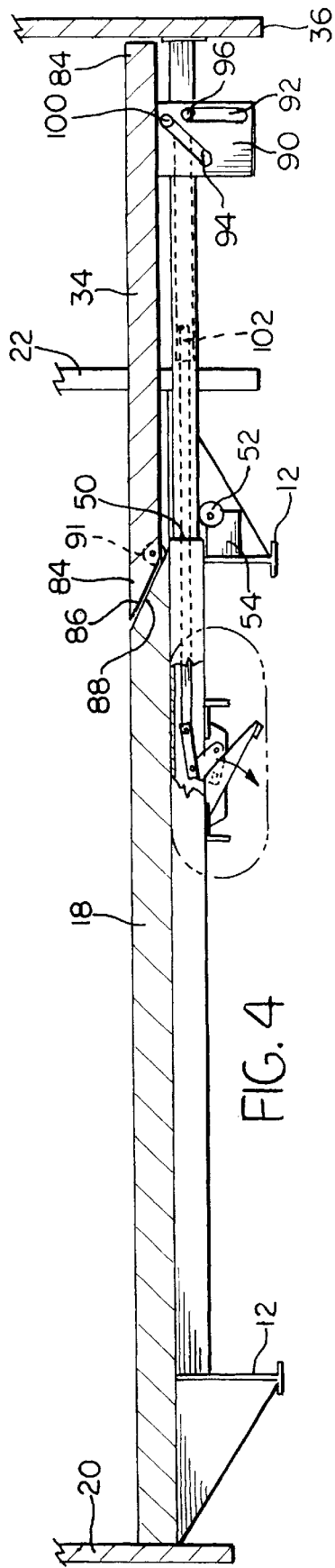
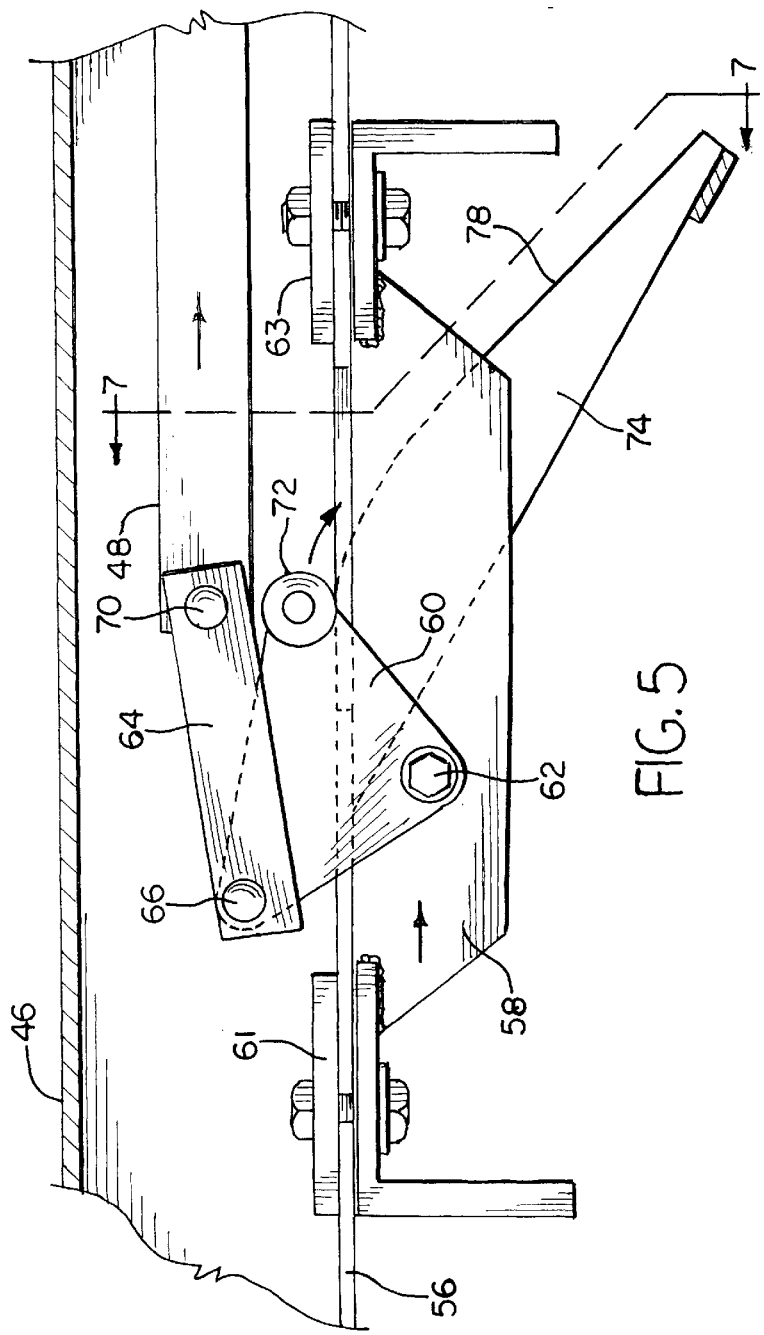

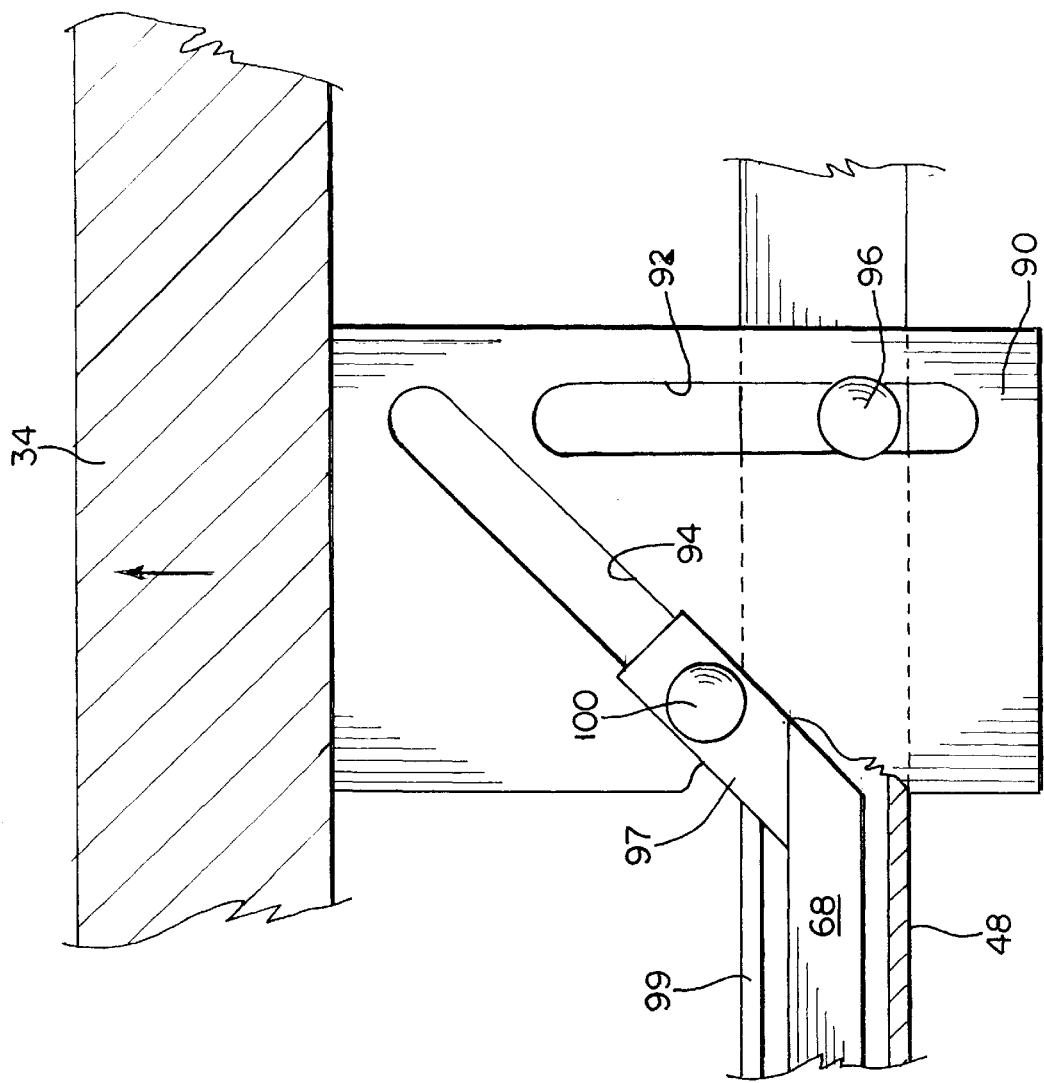
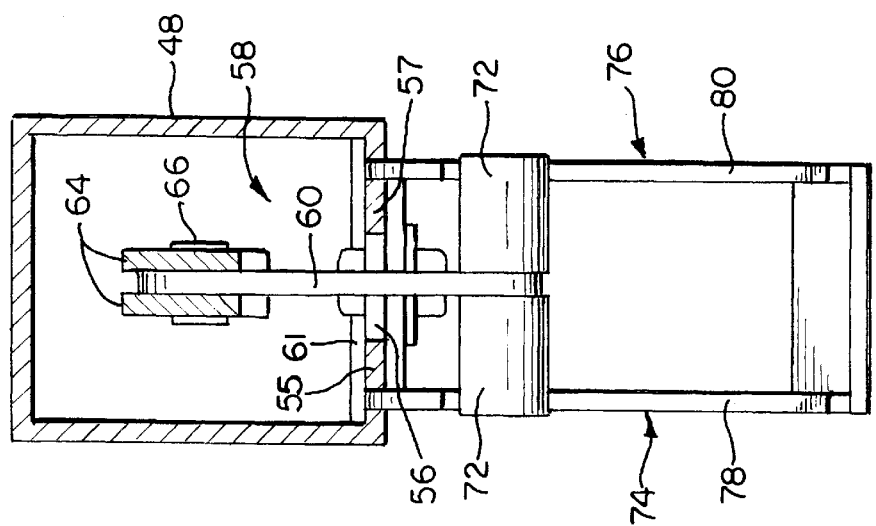

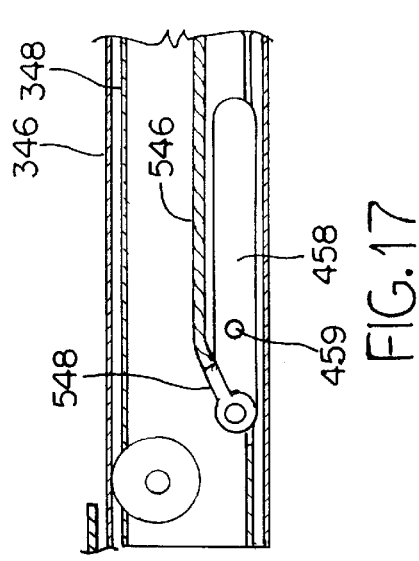
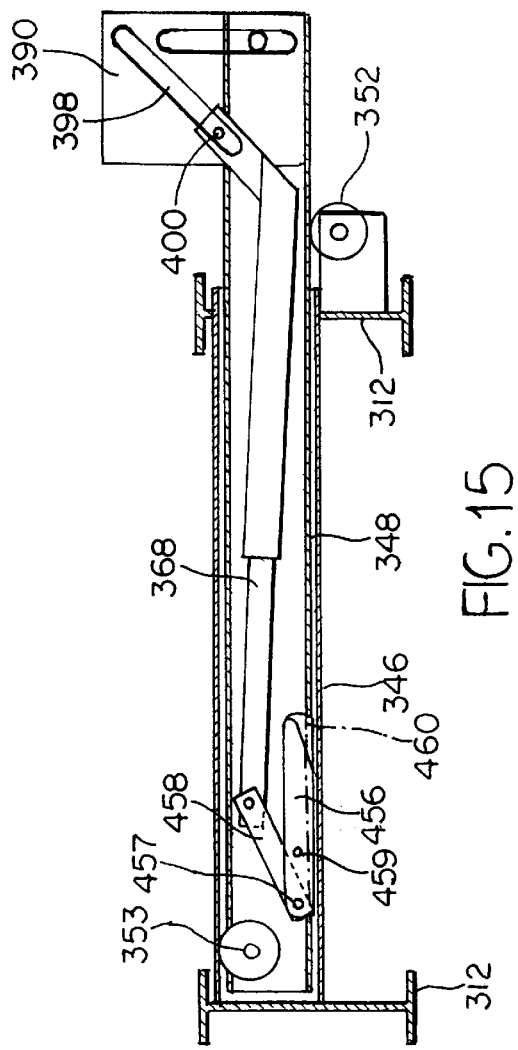
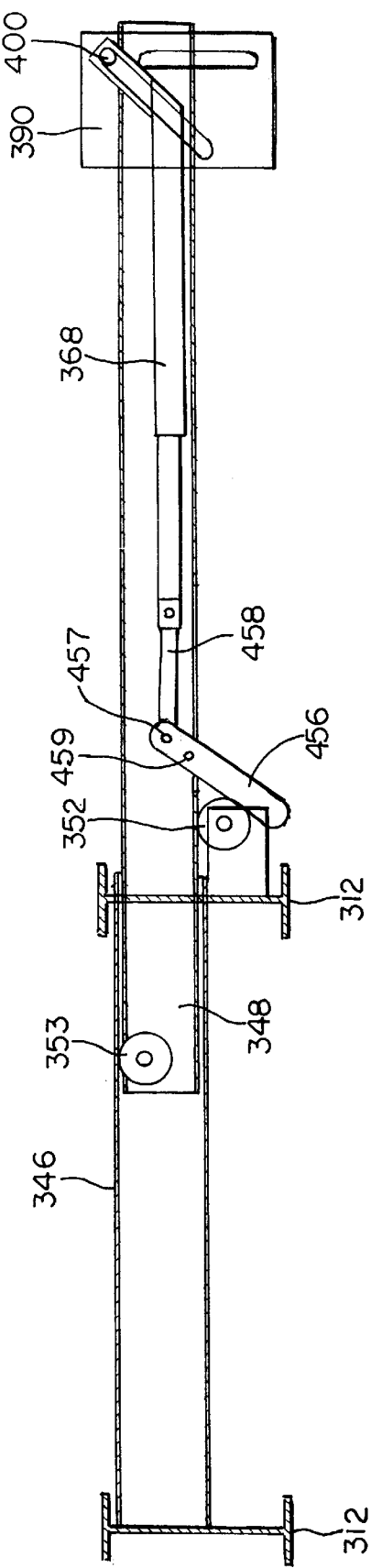

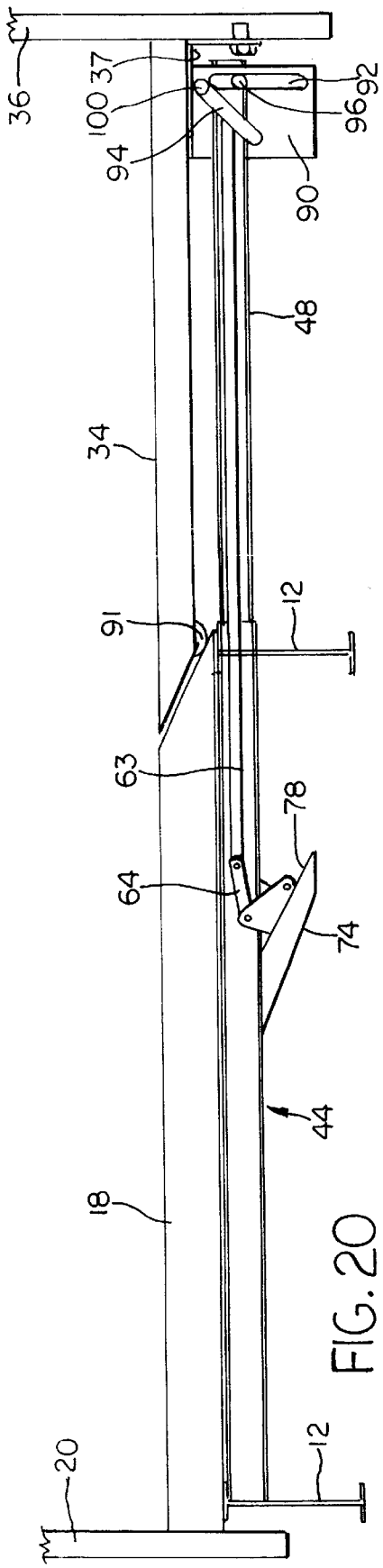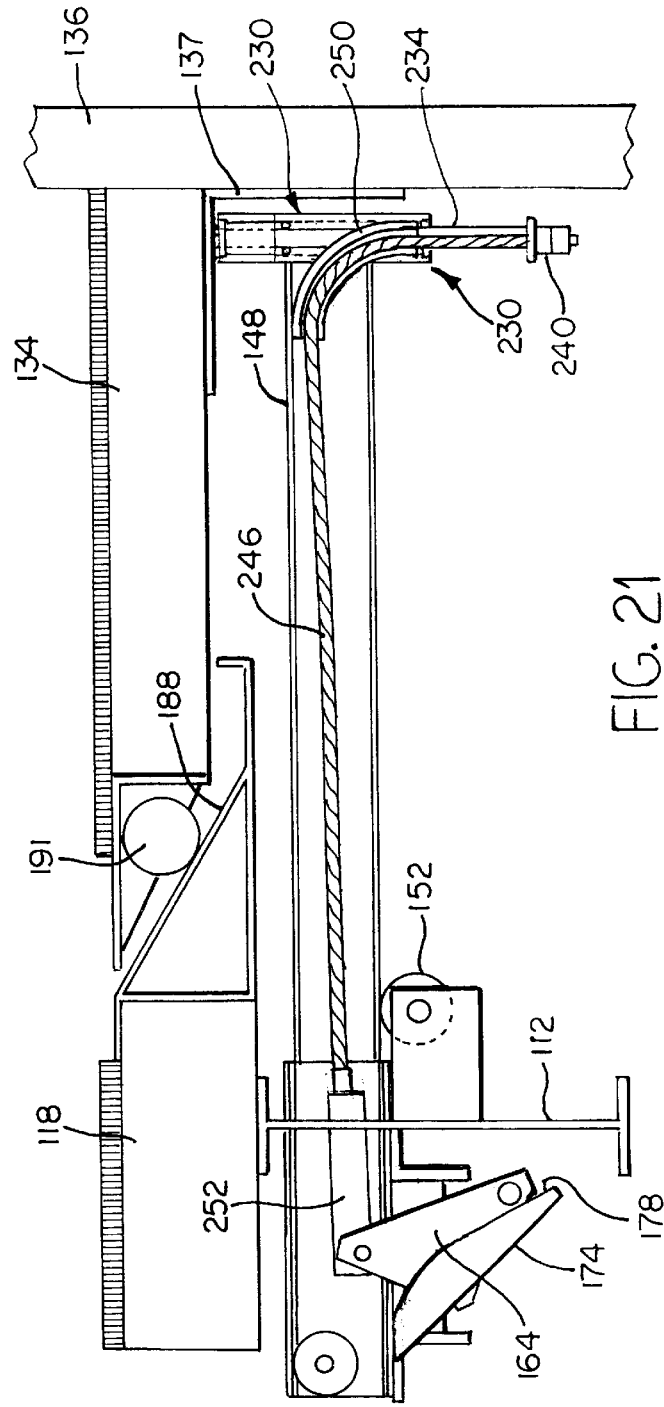

6,108,983

SLIDE OUT ROOM WITH FLUSH FLOOR

This application is a Continuation-in-Part of U.S. patent application Ser. No. 08/753,103, filed Nov. 20, 1996, now abandoned which claims domestic priority based upon U.S. Provisional Patent Application No. 60/015,574 filing date Nov. 20, 1995.

This invention relates to a retractable room for a recreational vehicle or manufactured housing which has a floor that is moved into a position flush with the floor of the main living area when the retractable room is extended.

The width of recreational vehicles and manufactured housing is limited to that which can be accommodated for travel on public roads. Accordingly, it is common to provide recreational vehicles and manufactured housing with a slide out room which can be retracted into the main living quarters when the mobile living quarters is moved, but which can be extended from the main living quarters to provide auxiliary living space when the mobile living quarters is parked for use. Since the retractable room must be retracted into the main living area, the floor of the retractable room must slide on the floor of the main living area when the retractable room is retracted. Accordingly, the level of the floor of the retractable room must be offset from the main floor when the retractable room is retracted. On the other hand, when the retractable room is extended to provide auxiliary living quarters the difference in level between the floor of the retractable or slide out room and the main floor is obviously extremely inconvenient. One way to level out the floors, as disclosed in U.S. Pat. No. 5, 491,933 is to drop the entire retractable room to a level in which the level of the floor of the retractable or slide out room is flush with the main floor. However, prior art mechanisms have dropped one end of the floor abruptly, causing the room to tilt as it is extended and retracted, which can cause articles within the room to slide. Also, by dropping the entire slide out room, head room is further reduced over that required to permit retraction of the slide out room. Another way to move the floor of the slide out room flush with the floor of the main living quarters is to move the floor relative to the walls of the slide out room.

A slide out or retractable room for mobile living quarters such as recreational vehicles and manufactured housing in which the floor of the slide out room moves relative to the walls and ceiling of the main living area as the slide out room is moved into its extended position is disclosed in our prior U.S. Pat. No. 5,577,351. The floor moves from a higher sliding position to permit the floor to slide along the main floor of the unit as the extendable or slide out room is extended or retracted, but the floor of the retractable room moves vertically relative to the walls of the room into a position flush with the main floor as the slide out room is moved into the extended position. As the room is retracted away from the extended position, the floor of the retractable room is moved upwardly relative to the main floor so that the floor of the retractable room can slide upon the main floor as the retractable room is retracted into the main living quarters. Accordingly, the desirable flush floor is provided, but the headroom in the retractable room is maintained, because the floor of the retractable room moves relative to the walls of the retractable room. One embodiment of the present invention relates to an improved actuation mechanism for raising and lowering the floor of the retractable room that assumes proper functioning of the floor while facilitating installation of the mechanism on the mobile living quarters. Another embodiment of the present invention relates to a mechanism for controlling movement of the slide out room in which raises and lowers the entire slide out room in such a way that the room is maintained in a substantially horizontal orientation as it is raised and lowered.

These and other advantages of the present invention will become apparent from the following description, with reference to the accompanying drawings, in which:

FIG. 2 is a fragmentary transverse cross sectional view of one embodiment of the invention taken through the floor, frame, and lower wall portions of the mobile living quarters illustrated in FIG. 1 with the retractable room being illustrated in its retracted position;

FIG. 3 is a view similar to FIG. 2, but illustrating the retractable room in a position just before the floor begins to drop into the flush position;

FIG. 4 is a view similar to FIGS. 2 and 3 but illustrating the floor in the lowered or flush position;

FIG. 5 is an enlargement of the circumscribed portion of FIG. 3;

FIG. 7 is a cross sectional view taken substantially along lines 7—7 of FIG. 5;

FIG. 8 is an enlarged, fragmentary view of the relative position of the camming plate and support member used in the present invention just before the floor of the slide-out room is dropped into the flush position;

FIGS. 15 and 16 are views similar to FIGS. 2 and 4 respectively, illustrating still another embodiment of the invention;

FIG. 17 is a view similar to FIGS. 2 and 15, but illustrating still another embodiment of the invention;

Figure 12:
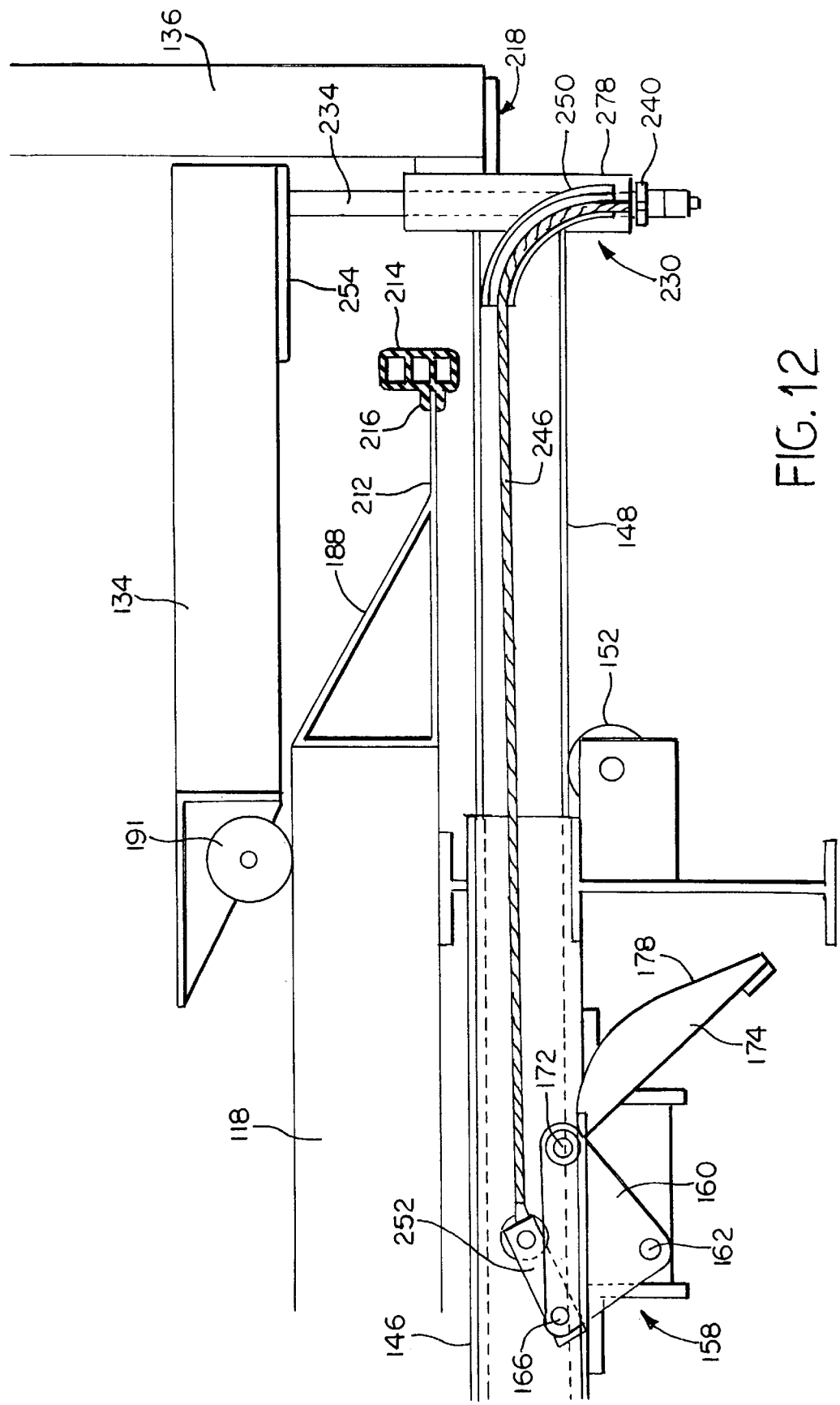
FIGS. 12 and 13 are views similar to FIGS. 2 and 4 respectively, but illustrating the embodiment of the invention shown in FIG. 11.
Figure 13:
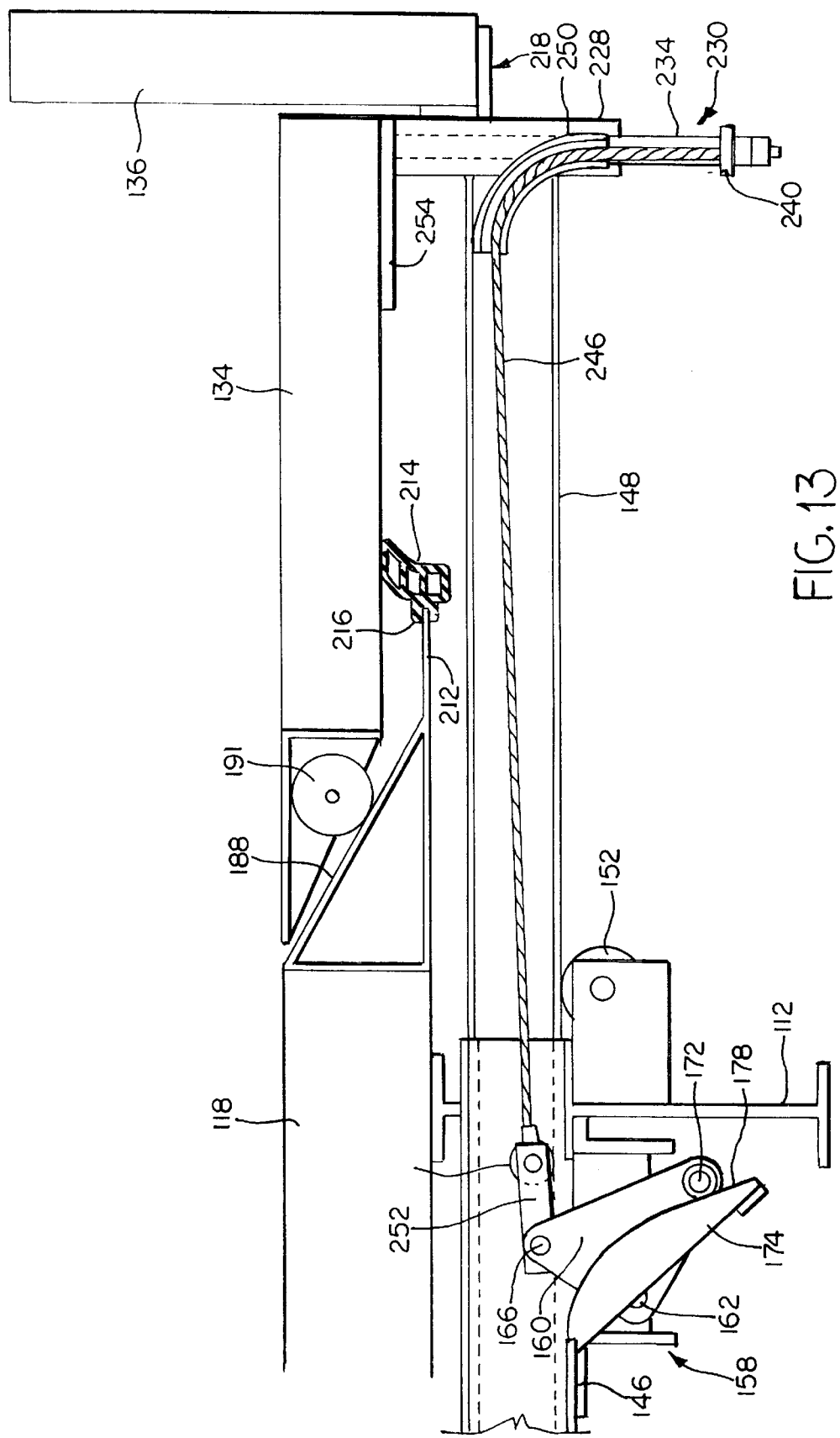
Figure 18:
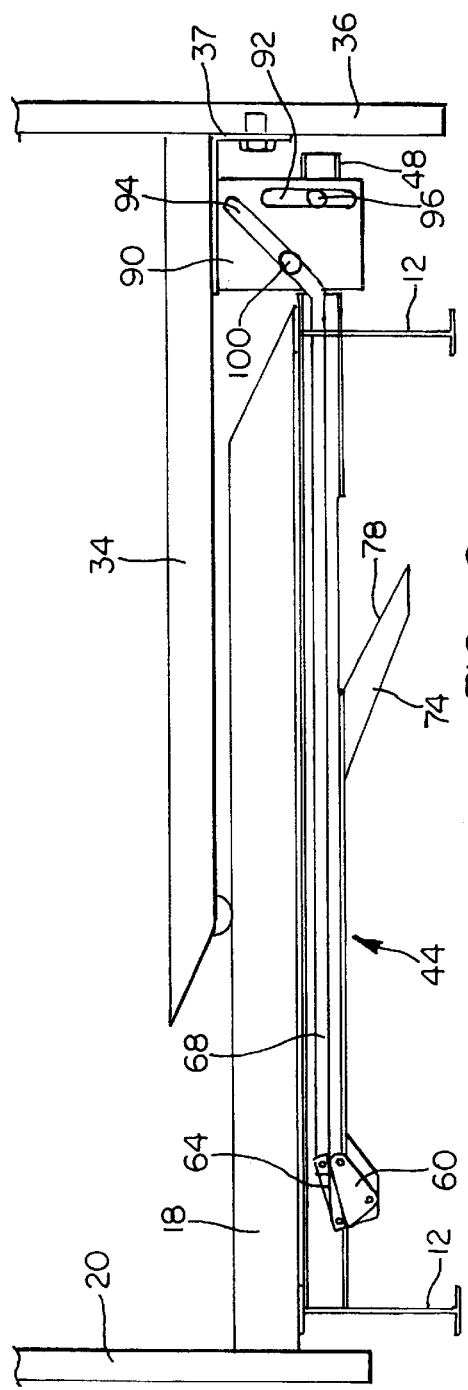
Figure 19:
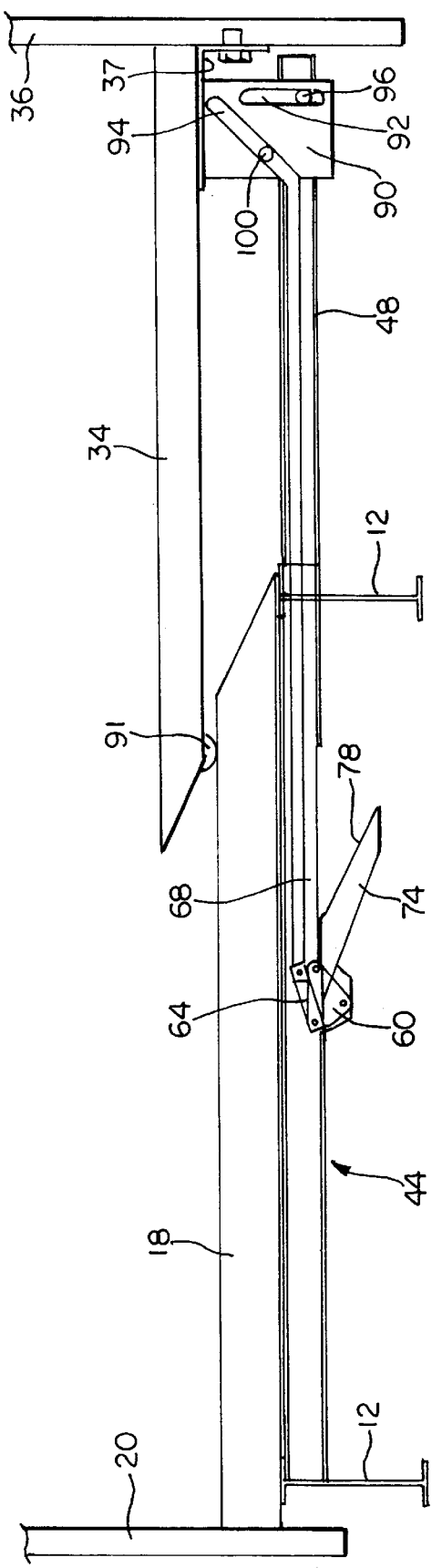
Figure 22:
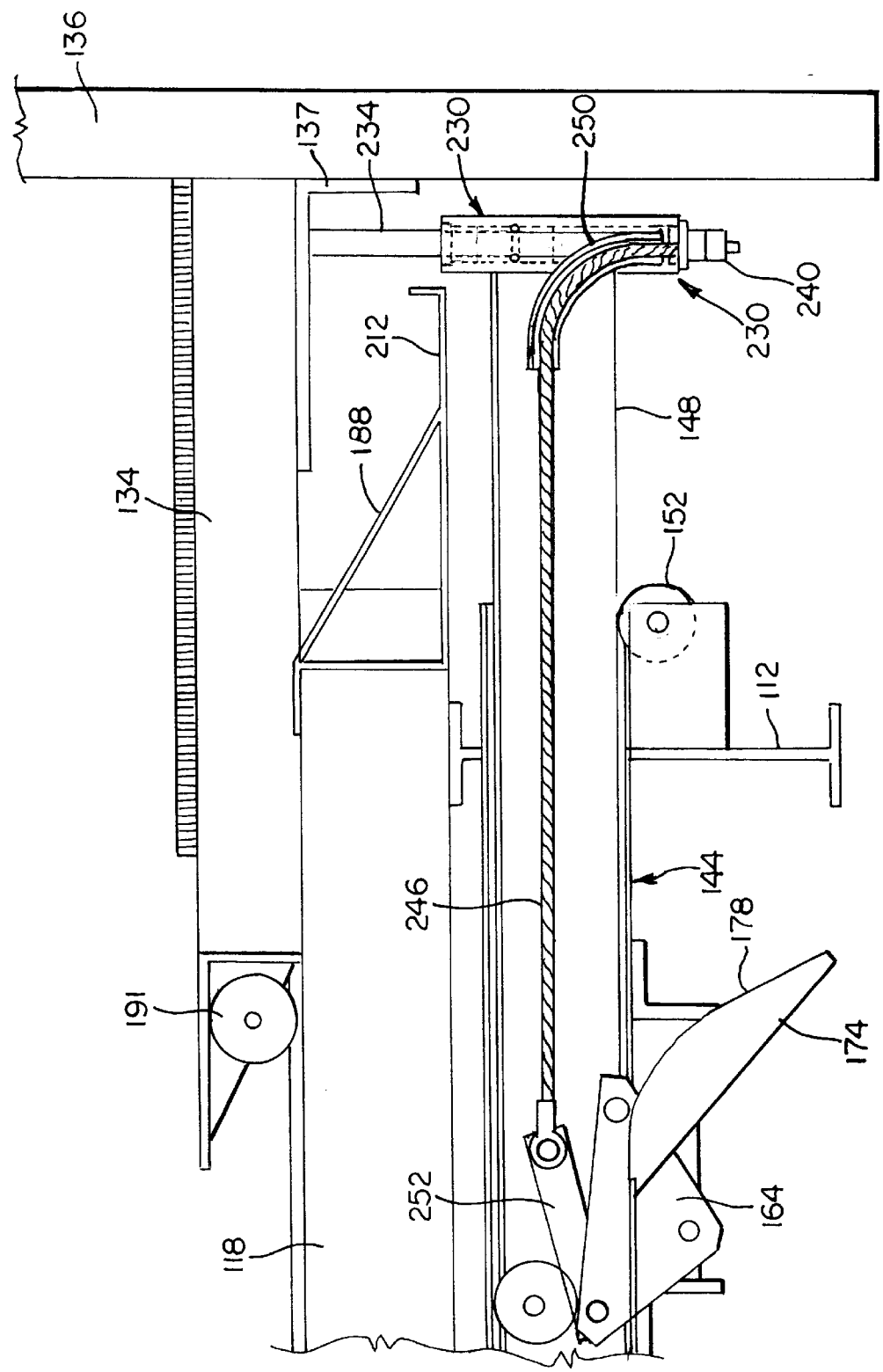

FIG. 18, FIG. 19, and FIG. 20 are views similar to FIGS. 2, 3 and 4 respectively, but illustrating another embodiment of the invention; and FIG. 21 and FIG. 22 are views similar to FIGS. 12 and 13 respectively, but illustrating still another embodiment of the invention.

Figure 1:
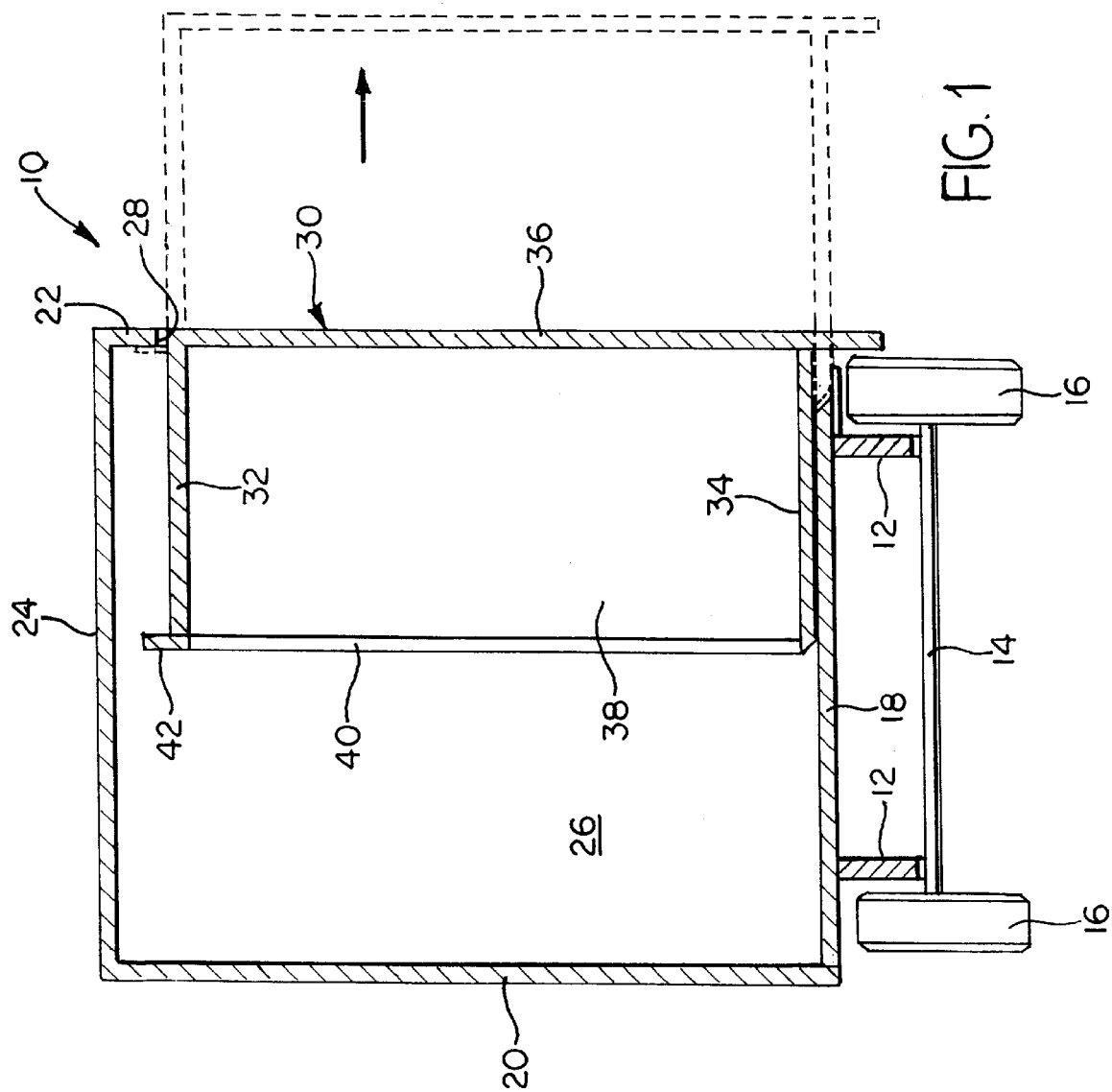
FIG. 1 is a cross sectional view of the mobile living quarters incorporating a retractable or slide out room; the room being shown in solid lines in its retracted position and in dashed lines in its extended position.
Figure 6:
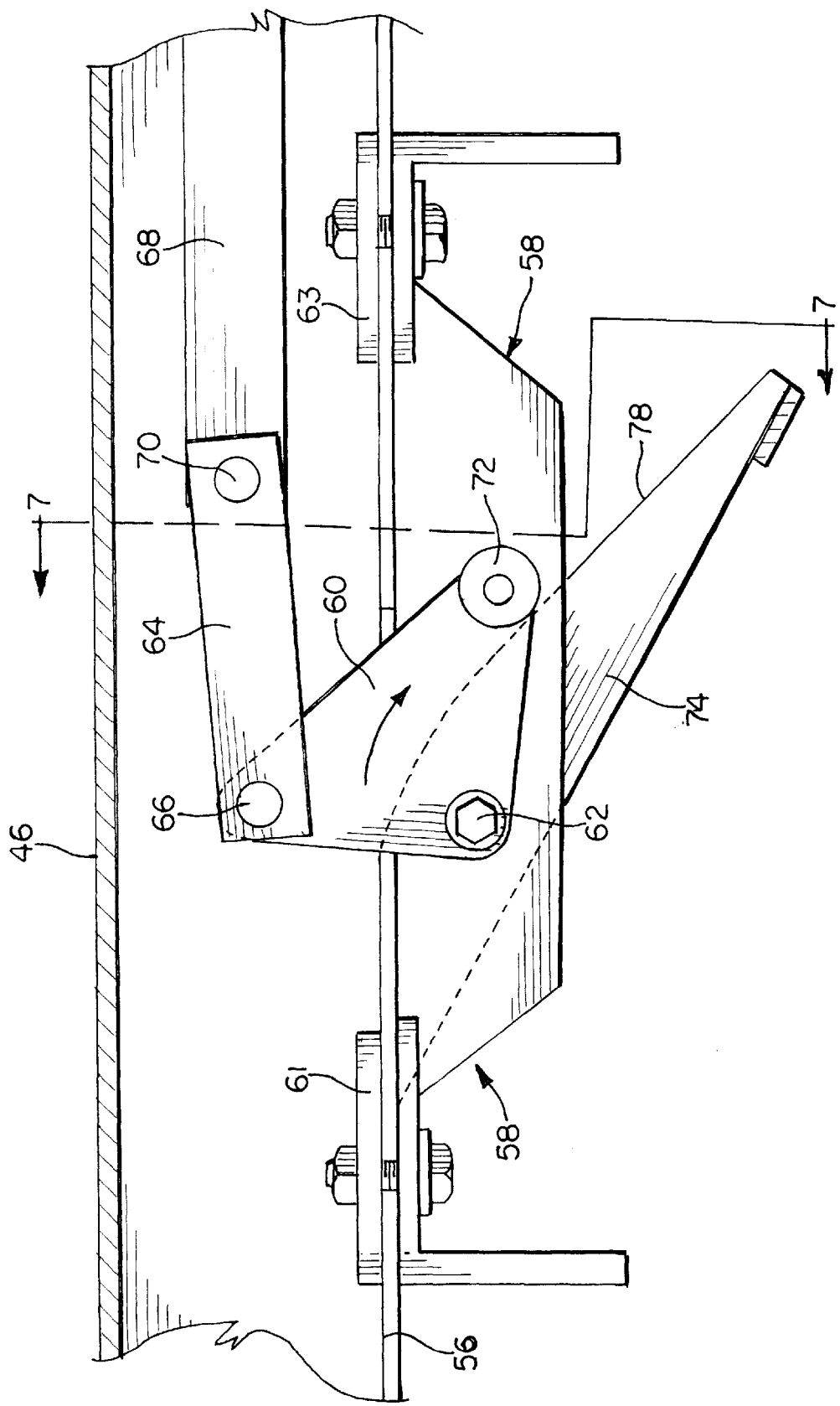
FIG. 6 is an enlargement of the circumscribed portion of FIG. 4.
Figure 10:
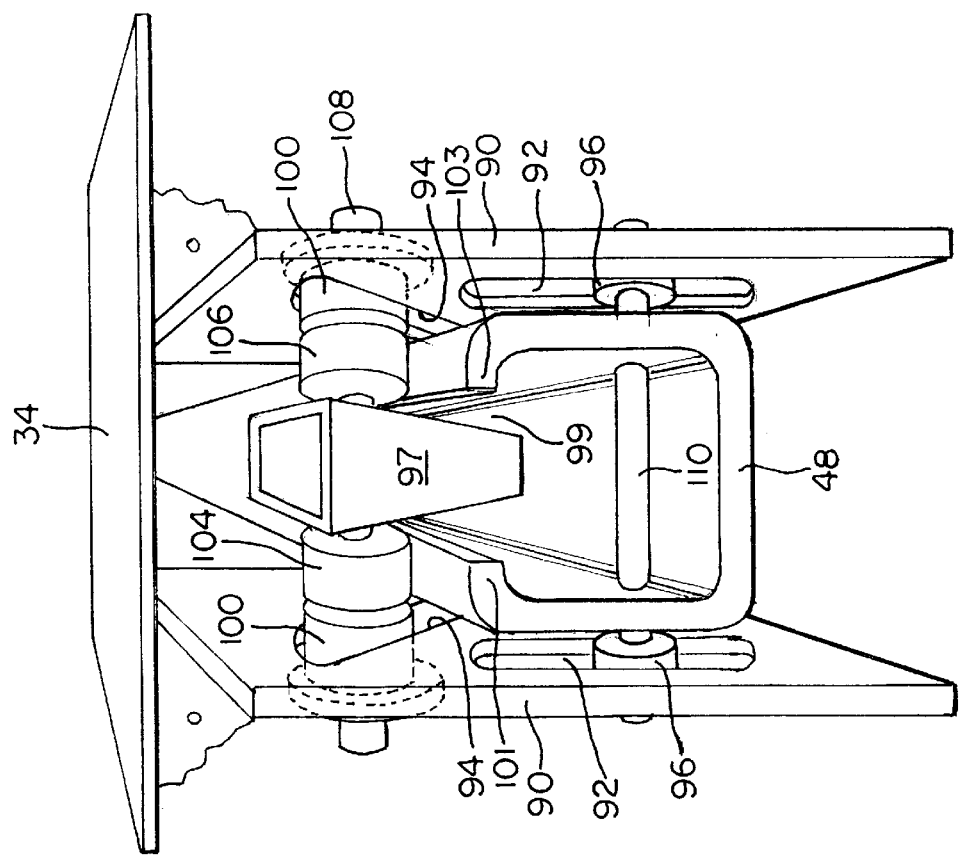
FIG. 10 is an end view in perspective taken substantially along lines 10—10 of FIG. 9.
Figure 9:
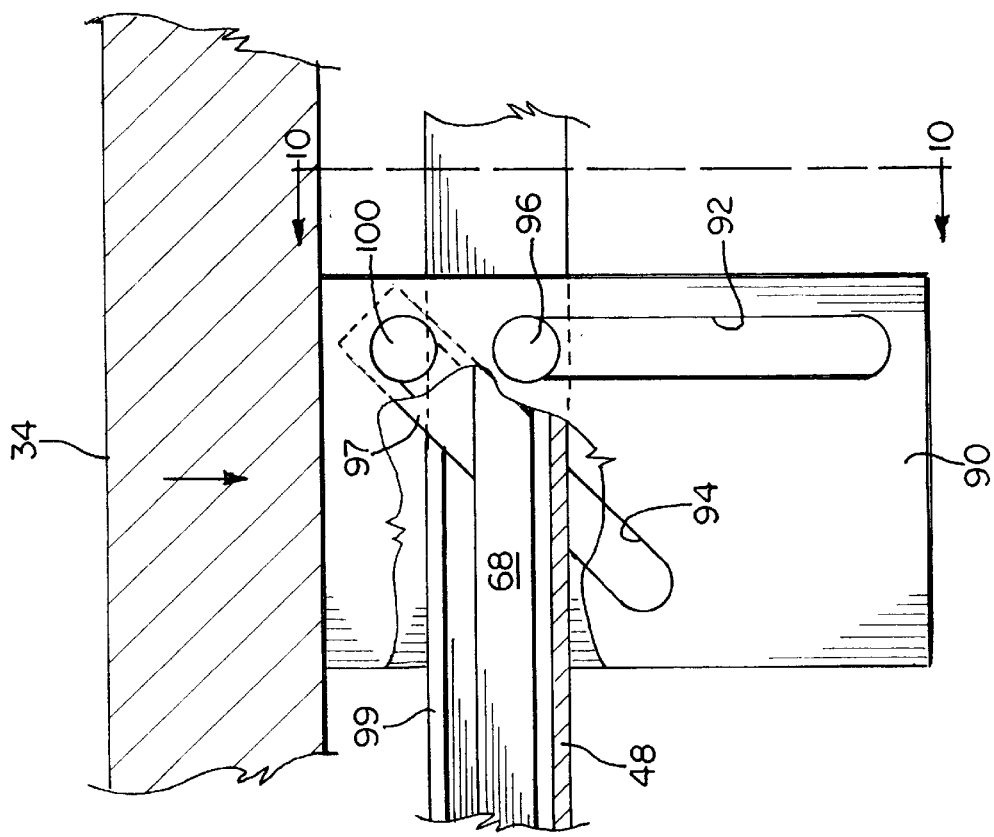
FIG. 9 is a view similar to FIG. 8, but illustrates the relative positions of the camming plate and support member after the floor of the slid-out room has been dropped into the flush position.

Referring now to the drawings, mobile living quarters generally indicated by the numeral 10 includes a frame 12 supported by an axle 14 and wheels 16. A main floor 18 is supported by the frame 12, and side walls 20, 22 and ceiling 24 cooperate with floor 18 to define a main living quarters 26. An opening 28 is formed in the side wall 22 for receiving a slide out or retractable room generally indicated by the numeral 30. The retractable or slide out room 30 includes a ceiling 32, a floor 34, which will be described in detail hereinafter, an outer wall 36, and side walls 38. Side walls 38, floor 34, and ceiling 32 define an open end 40 such that when the slide out or retractable room 30 is moved into the extended position illustrated by the dotted lines in FIG. 1, access is provided between the main living quarters and the auxiliary living quarters provided by the slide out room 30. A lip 42 carried on the ceiling 32 and side walls 38 of the slide out or retractable room 30 extends at least part of the way around the opening 40 and is adapted to sealingly engage the portion of side wall 22 circumscribing the opening 28.

The retractable or slide out room 30 is supported on the frame 12 by extensible slide out room support members generally indicated by the numeral 44. Although only one set of the members 44 are illustrated in FIGS. 1–10, it will be understood that at least two, and possibly additional sets of the members 44 will be necessary to support the room 30 from movement relative to the unit 10, such is illustrated in the alternate embodiment illustrated in FIG. 11. The extensible members 44 include an outer tube or channel member 46 which is secured to the frame 12 and an inner tube 48 which is slidably received within, and supported by, the outer tube 46. The inner tube 48 extends from end 50 of the tube 46 and is secured to the wall 36 of retractable room 30 to support and guide the latter for movement relative to the frame 12. A roller 52 is mounted on an extension 54 of the frame 12 and engages the inner tube 48 as it extends from the end 50 to support the latter. A carrier 58 slides along a slot 56 which extends along the outer tube 46 and is of a width and length sufficient to accommodate movement of the carrier 58. The carrier 58 carries a generally triangular lever 60 which is pivotally connected to the carrier 58 by a pivot pin 62. Opposite ends of the carrier 58 are supported by transversely extending glides 61, 63 which extend across the slot 56 and are slidably supported by an inwardly extending track or flanges 55, 57 which define the slot 56. A pair of links 64 are pivotally connected to the lever 60 by a pivot pin 66 and are also connected to an elongated member 68 which extends within the tubes 46, 48 by a pivot pin 70. The triangle shaped lever 60 includes a pair of cam followers or rollers 72 mounted on opposite sides of the lever 60, which roll along the flanges 55, 57 as will hereinafter be explained. A pair of arms 74, 76 extend from the outer tube 46 on opposite sides of the slot 56 near an end of the latter. The arms 74, 76 project outwardly as indicated in FIGS. 2–4, and each define a camming surface 78, 80 that are engaged by the cam followers or rollers 72 as will also be hereinafter explained.

The floor 34 includes an end 82 which terminates adjacent the wall 36 and an opposite end 84 which is provided with a taper 86 which generally conforms to a corresponding taper 88 on the floor 18 when the slide out room is in the extended position illustrated in FIG. 4. A riser mechanism comprising a pair of riser or camming plates 90 is secured to the floor 34 adjacent the end 82 thereof and extended adjacent opposite sides of the inner tube 48. Each riser or camming plate 90 is provided with a generally vertical riser slot 92 and an obliquely inclined riser slot 94. The end of the elongated member 68 opposite the end secured to the link 64 by the pivot 70 terminates in an obliquely extending portion 97 which projects through an axially extending slot 99 in the inner tube 48. The slot 99 is defined by inwardly extending flanges 101, 103 of inner tube 48. A first pair of rollers 104, 106 are rotatably mounted on a shaft 108 which is carried by portion 97 of elongated member 68. Each of the rollers 104, 106 roll along their corresponding flanges 101, 103 to thereby support the end of elongated member 68 and its obliquely extending portion 97. Substantially identical oblique slot followers or rollers 100 are also rotatable about shaft 108 and extend into obliquely inclined riser slots 94. As will become apparent, the rollers 100 rotate in a direction opposite to the rollers 104, 106. A shaft 110 extends through inner tube 48 and rotatable mounts vertical slot follower rollers 96 in vertical slot 92. The slot 99 is sufficiently long to accommodate movement of the elongated member 68 from the position illustrated in FIG. 8 to the position illustrated in FIG. 9. An adjustment is provided as at 102 to permit the length of the elongated member 68 to be adjusted.

In operation, the room 30 as illustrated in FIG. 2 in the position in which it assumes when the room is fully retracted. In this condition, the floor 34 of the retractable room slides along the main floor 18 and is supported thereon by the roller 91. The floor 34 is also supported by the engagement of the oblique slot follower rollers 96 in obliquely inclined slot 94. When the room 30 is to be extended, room 30 is moved to the right viewing the Figures by use of, for example, hydraulic rams (not shown) or other appropriate power devices, such that the inner tube 48 slides along the outer tube 46. As the inner tube extends from end 50 of outer tube 46, plates 90, 91 are moved therewith. Since the plates 90, 91 are secured to the floor 34, the floor 34 is also moved. Since the elongated member 68 is connected to the carrier 58 through the triangular lever 60, the carrier is moved with the inner tube 48 along the slot 56 of the outer tube 44. The weight of the floor 34 acting through the riser plates 90, 91 and rollers 100 exert a biasing force maintaining the rollers 104, 106 against the flanges 101, 103. This biasing force is transmitted through elongated member 68 to urge lever 60 about pivot pin 62 in a direction maintaining rolling contact of the rollers 72 with the flanges 55, 57.

FIG. 3 illustrates the floor 34 just as the roller 91 begins to roll down the inclined surface 88 of the floor 18 to move the floor 34 into the lowered or flush position. The floor 34 is kept level by the engagement of the rollers 96 in the inclined riser slots 94. The length of the elongated member 68 is adjusted when the unit is assembled by way of the adjustment 102 so that the rollers 72 engage the camming surfaces 78 just as the roller 91 reaches the FIG. 3 position. As the roller 91 rolls down the inclined surface 88, the rollers 72 roll down the camming surfaces 78, 80 due to the biasing force exerted by the weight of the floor 34 transmitted through elongated member 68 as described above. Before rollers 72 engage camming surfaces 78, 80, the elongated member does not move relative to the inner tube 48. As the rollers 72 roll down camming surfaces 78, 80, elongated member 68 is moved relative to inner tube 48, causing rollers 104, 106 to move along flanges 101, 103 and causing rollers 100 to move upwardly within inclined slots 94, to permit the floor 34 to be lowered into the flush position. It will be noted that rollers 100 rotate in a direction opposite that of rollers 104, 106. Movement of the floor is constrained to be in a vertical direction by engagement of the rollers 96 in vertical slot 92 as the rollers 96 move within the riser slots 94.

Figure 11:
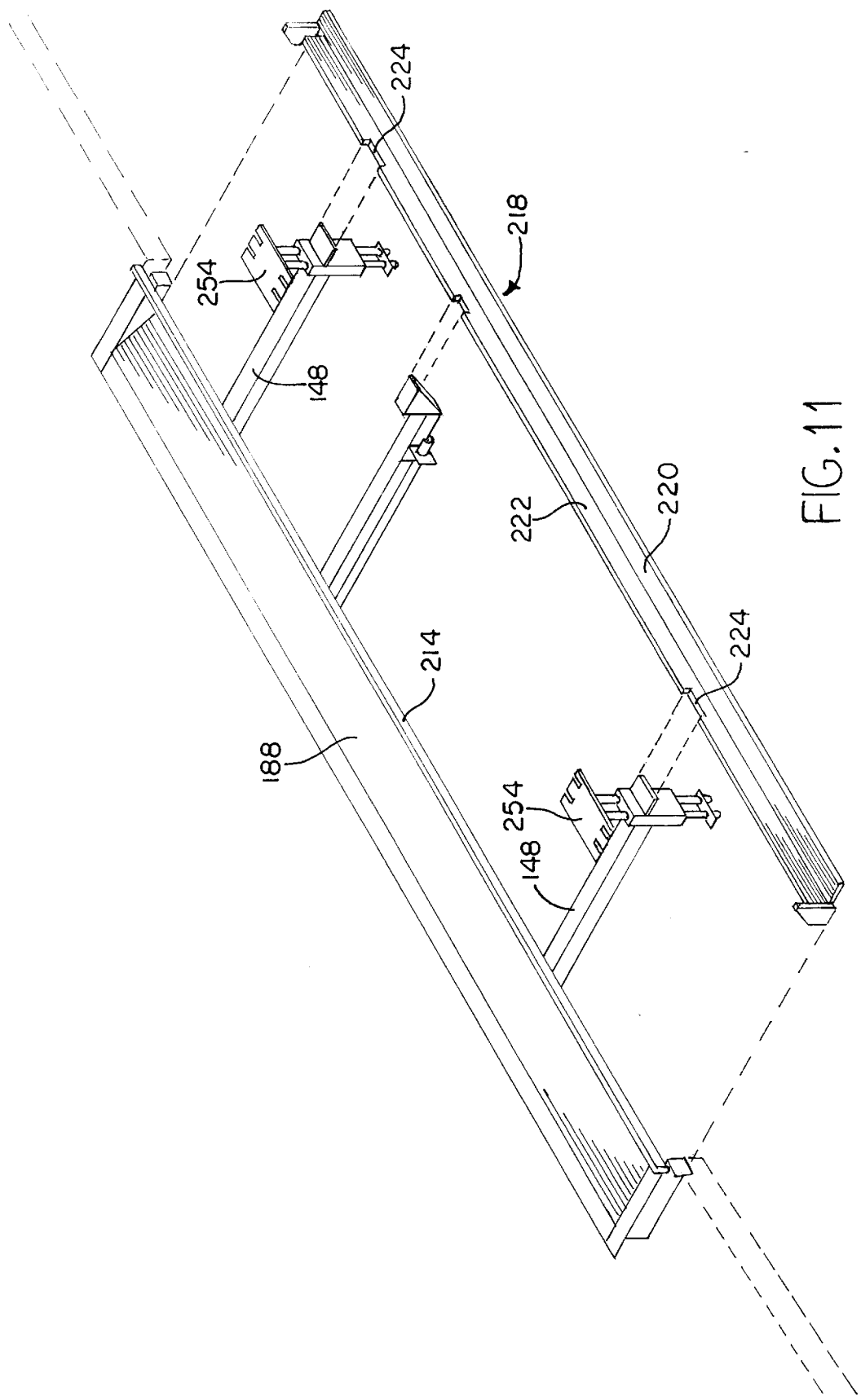
FIG. 11 is an exploded view in perspective of the actuation mechanism of an another embodiment of the invention, which is shown with the movable floor of the slide out room removed.

Referring now to the embodiment of FIGS. 11–14, elements the same or substantially the same as those in the embodiment in FIGS. 1–10 retain the same reference numeral, but increased by 100. In the embodiment of FIGS. 11–13, the downwardly extending taper 188 extending from main floor 18 is provided with a lip 212 that extends from the taper 188 toward the wall 136 of the retractable room 230. A flexible seal 214 which includes a securing portion 216 which extends upwardly from the lip 212 and is adapted to be sealingly engaged by the movable floor 134 when the latter is in the lowered or flush position illustrated in FIG.

13. The wall 136 of the retractable room 130 is supported in a longitudinally extending cross beam support generally indicated by the numeral 218, which extends substantially parallel to frame member 112. The support includes a horizontal ledge 220 which supports the wall 136 and an upwardly projecting portion 222. The upwardly projecting portion 222 acts to prevent bending of the cross brace and is notched at 224 to receive horizontally projecting portion 226 of a housing 228 which is a component of the riser mechanism generally indicated by the number 230. The housing 228 includes a pair of substantially parallel vertical bores 232 that slidably receive a corresponding pair of control rods 234. The bores 232 may be sealed around the rods to protect the sliding operations of the rod within the bores against moisture, and other environmental contaminants. The rods 234 extend all the way through the housing 228 and project through the lower end 236 thereof. The projecting portions 238 of the rods 234 are provided with threads and are connected together by a pull plate 240. The pull plate 240 can be adjusted relative to the rods 234 by rotation of fasteners 242, 244 above and below the pull plate 240. The pull plate includes an aperture receiving a flexible cable 246 which is provided with a stop nut 248 to prevent the end of the cable from being pulled through the aperture in the pull plate 240.

The cable 246 replaces the elongated member 68 in the embodiment of FIGS. 1–10. A cable guide 250 curves downwardly viewing FIG. 12 out of the open end of the inner tube 148. The end of the cable 246 opposite the end attached to the cable pull 240 is secured to the pivot 166 of the triangle levers 160 through a link 252. The ends of the rods 234 which project above the housing 228 are secured to a horizontally extending mounting plate 254 which is secured to the moveable floor 134.

In operation, the carriage 158, levers 160, and surfaces 178 in the embodiment of FIGS. 11–13 operate exactly the same way as the corresponding elements do in the embodiment of FIGS. 1–10. Accordingly, as the carriage 158 travels with the inner tube 148 as it is extended from the outer tube and before the carriage reaches the camming surfaces 178, the moveable floor 134 travels along the main floor 118 supported by the roller 191. The rods 234 remain in their upper position extended from the housing 228, and the cable pull 240 is in its upper position adjacent to the end of the housing 228. As the roller 191 supporting the movable floor 134 approaches the taper 188, the carriage 158 and levers 160 approach the camming surfaces 178. As the levers 160 rotate and the rollers 172 travel down the camming surface 178, the weight of the movable floor 134 urges the rods 234 downwardly viewing the figures, thereby causing the cable pull 240 to maintain the cable 246 taunt as the levers 160 rotate. Accordingly, the rods 234 move downwardly, thereby also permitting the moveable floor 134 to move downwardly as the roller 191 travels down the taper 188. When the extendable room is retracted, movement of the carriage 158 away from the camming surfaces 178 pulls the cable 246 to the left viewing the figures, thereby pulling the cable pull 240 and the rods 234 upwardly as the roller 191 moves up the taper 188. The mechanism can be adjusted to assure that the movement of the rods 234 is synchronized with movement of the roller 191 up and down the taper 188 by adjusting the fasteners 242, 244. Accordingly, adjustment of the mechanism is relatively easy to compensate for variations in the mechanism. When the slide out room is fully retracted, seal 214 seals against the cross beam support 218, to restrict entry of moisture and dust into the living quarters. Although the riser mechanism 230 is described in connection with the carriage 158, levers 160 and camming surface 178, it will also be noted that the riser mechanism 230 can be used with the control mechanism illustrated in the embodiments of FIGS. 14–17.

Referring now to the embodiment of FIGS. 15–16, elements the same or substantially the same as the corresponding elements in the embodiment of FIGS. 11–14 retaining the same reference character, but increased by 300. In the embodiments of FIGS. 15–16, inner tube 348 is supported within outer tube 346 by roller 352, 353, and elongated member 368 extends between the riser mechanism and a paddle shaped lever 456, and is attached to lever 456 and pivot 457 through link 458. Lever 456 is pivotally connected to inner tube 348 by a pivot pin 459. The lever 456 extends partially through a slot 460 in the inner tube 348 and rides along the outer tube 346 as the inner tube moves relative to the outer tube. The inner tube 348 extends from the outer tube 346 a distance sufficient to permit the lever 456 to drop out of the slot 460, the lever 456 rolls in back of the roller 352 to the position illustrated in FIG. 16. As this occurs, floor is maintained level by the riser mechanism engaging the elongated member 368. The riser mechanism ; is identical to that used in the embodiment of FIGS. 1–11. As the retractable room is retracted, movement of the inner tube 348 a sufficient distance that the lever 456 is rotated in the counterclockwise direction into the substantially horizontal position in which the lever can travel within the outer tube 346. As illustrated in FIG. 17, the lever 456 may be used with the riser mechanism illustrated in FIGS. 11–14, the cable 546 being attached to the lever 456 through link 548.

Referring now to the embodiment of FIGS. 18, 19 and 20, elements the same or substantially the same as corresponding elements in the embodiment of FIGS. 2–4 retain the same reference character. The difference between the embodiment of FIGS. 18–20 from FIGS. 2–4 is that in the embodiment of FIGS. 18–20, the moveable floor 34 is rigidly connected to the walls 36 of the retractable room so that the floor 34 will be shifted, both horizontally and vertically, with the walls 36. Angle brackets 37 may be employed to secure the moveable floor 34 to the walls 36. The riser plate 90 is attached to the moveable floor 34, and responds to the linkage including elongated member 68 to lower both the moveable floor 34 and the walls 36 into the flush position as the retractable room is moved into the fully extended position illustrated in FIG. 20, and to raise the retractable room, including both the moveable floor 34 and the walls 36, as the room is moved away from the extended position into the retracted position illustrated in FIG. 18. The riser plate 90 and the linkage maintain the floor 34 substantially level as the floor is raised and lowered so that cocking and tilting of the entire retractable room is avoided.

Figure 14:
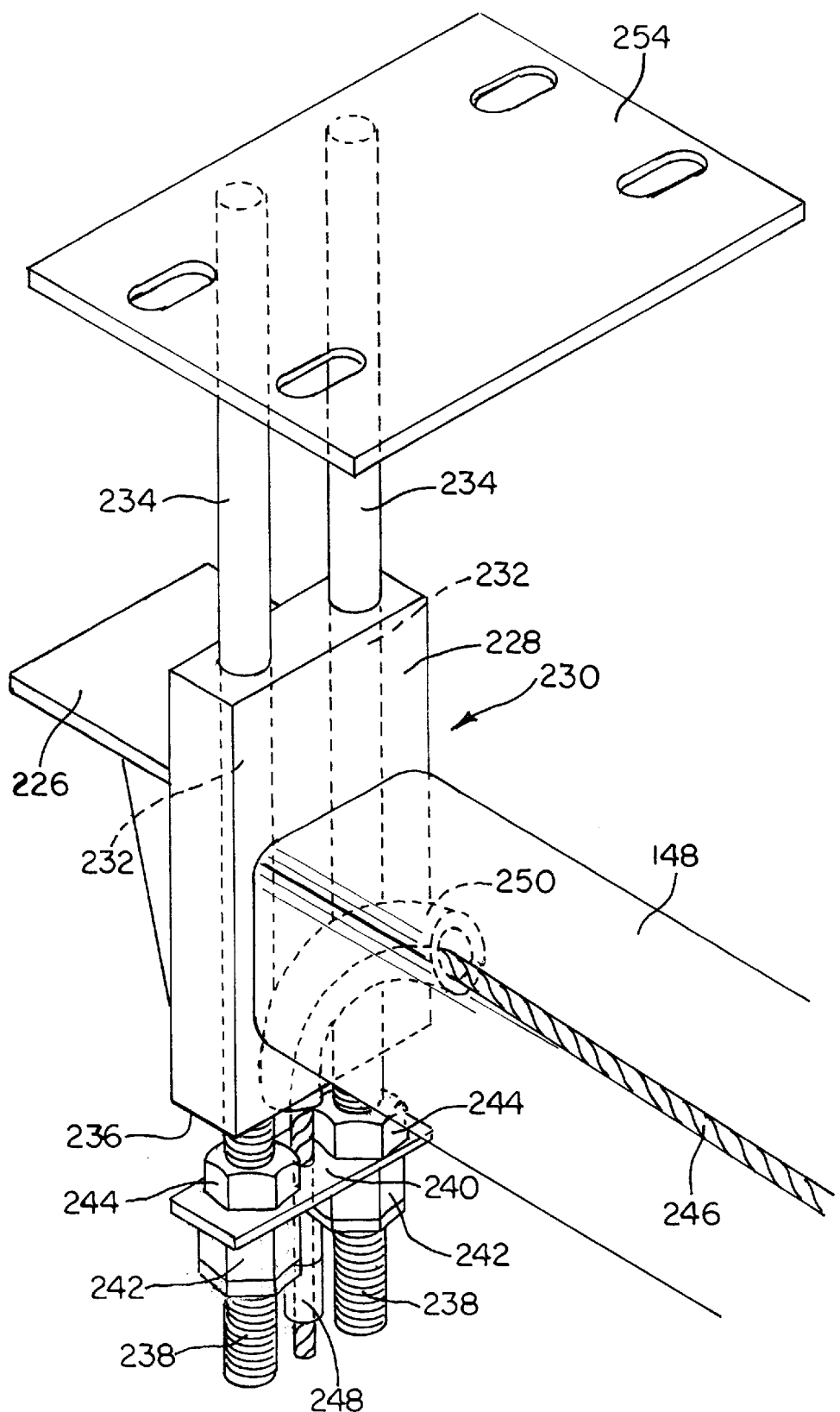
FIG. 14 is a detailed view in perspective of that portion of the actuation mechanism illustrated in FIGS. 11, 12 and 13 which connects the actuation linkage to the floor the removable room.

Similarly, in the embodiment of FIGS. 21 and 22, which is similar to the embodiment of FIGS. 12–14 and retains the same reference characters for like parts, the riser mechanism 230, which is identical to the riser mechanism 230 in the embodiment of FIGS. 12–14, is mounted on the end of the inner member 148. As in the embodiment of FIGS. 18–20, the moveable floor 134 is rigidly mounted to the walls 136 of the retractable room with a bracket 137 providing the connection. The riser mechanism 230 lifts the moveable floor 134 with the walls 136 during retraction of the moveable room, so that the entire moveable room is lifted to bring the floor 134 up to the sliding position illustrated in FIG. 22 when the room is retracted. When the room is extended, the rise mechanism 230 effects controlled lowering of the retractable room, so that cocking and tilting of the room during extension and retraction is avoided, but the floor 134 is moved between the flush position illustrated in FIG. 21 when the room is fully extended to the sliding position illustrated in FIG. 22 as the room is retracted.

What is claimed is:

1. Mobile living quarters comprising a frame, a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor movable along said main floor with the walls from a sliding position sliding upon said main floor to a flush position substantially flush with said main floor when the retractable room is in the extended position, retractable room support means mounted on said frame and engaging said retractable room to guide the latter for movement relative to said frame, linkage means operated by said retractable room support means and a riser mechanism mounted for movement with the retractable room for controlling movement of said movable floor relative to said main floor, said linkage means engaging said riser mechanism through a sliding connection to move said movable floor into said flush position as said retractable room is moved into said extended position, said riser mechanism is a riser plate mounted on said movable floor and has an obliquely extending slot extending obliquely with respect to the linkage means, said linkage means including an elongated member carrying a follower engaging said obliquely extending slot.

2. Mobile living quarters as claimed in claim 1, wherein said riser plate includes means for restricting movement of the riser plate to a generally vertical direction.

3. Mobile living quarters as claimed in claim 2, wherein said means for restricting movement of the riser plate includes a generally vertically extending riser slot and a riser follower engaging said riser slot carried by said retractable room support means.

4. Mobile living quarters as claimed in claim 1, wherein said movable floor is rigidly secured to the walls of the retractable room and said riser mechanism is operated by said linkage means to lower the moveable floor and the walls of the retractable room into the flush position.

5. Mobile living quarters as claimed in claim 1, wherein said retractable room support means is connected to the walls of the movable room and said movable floor is movable relative to the walls of the retractable room, said riser mechanism shifting said floor between said sliding and flush positions.

6. Mobile living quarters as claimed in claim 1, wherein said linkage means includes an elongated member having one end engaging said riser mechanism and an opposite end, and a lever actuator pivotally connected to said opposite end for moving said elongated member relative to said riser mechanism.

7. Mobile living quarters comprising a frame a main floor supported by said frame, means extending from said main floor to define with said main floor a main living area, a retractable room mounted for movement from a retracted position retracted into the main living area to an extended position extended from said main living area to provide an auxiliary living area, said retractable room having walls and a movable floor movable along said main floor with the walls from a sliding position sliding upon said main floor to a flush position substantially flush with said main floor when the retractable room is in the extended position, retractable room support means mounted on said frame and engaging said retractable room to guide the latter for movement relative to said frame, linkage means operated by said retractable room support means and a riser mechanism mounted for movement with the retractable room for controlling movement of said movable floor relative to said main floor, said linkage means engaging said riser mechanism through a sliding connection to move said movable floor into said flush position as said retractable room is moved into said extended position, said riser mechanism is mounted for movement with said retractable room support means and defines a bore slidably receiving a connector and guiding said connector for movement in a generally vertical direction.

8. Mobile living quarters as claimed in claim 7, wherein said movable floor is rigidly connected to the walls of the retractable room, and said connector is secured to the retractable room for guiding movement of the latter in a generally vertical direction.

9. Mobile living quarters as claimed in claim 7, wherein said movable floor is movable relative to the walls of the retractable room, and said connector is secured to said floor for guiding movement of the latter relative to the walls of the retractable room in a generally vertical direction.

10. Mobile living quarters as claimed in claim 7, wherein said linkage means includes an elongated member having one end attached to said connector and an opposite end pivotally connected to a lever actuator, said lever actuator pivoting to move said connector relative to said retractable room support means through said elongated member when the movable floor moves between said sliding position and said flush position.

11. Mobile living quarters as claimed in claim 10, wherein said elongated member includes a flexible member extending between said lever actuator and said connector.

12. Mobile living quarters as claimed in claim 10, wherein said retractable room support means includes a pair of coaxial, relatively movable tubular members, said elongated member extending within said tubular members between said lever actuator and said connector.

13. Mobile living quarters comprising a frame, a main floor supported by said frame, means extending from said main floor to define with said main floor a main living area, a retractable room mounted for movement from a retracted position retraced into the main living area to an extended position extended from said main living area to provide an auxiliary living area, said retractable room having walls and a movable floor movable along said main floor with the walls from a sliding position sliding upon said main floor to a flush position substantially flush with said main floor when the retractable room is in the extended position, retractable room support means mounted on said frame and engaging said retractable room to guide the latter for movement relative to said frame, linkage means operated by said retractable room support means and a riser mechanism mounted for movement with the retractable room for controlling movement of said movable floor relative to said main floor, said linkage means engaging said riser mechanism through a sliding connection to move said movable floor into said flush position as said retractable room is moved into said extended position, said retractable room support means includes a pair of coaxial, relatively movable members, one of said members being slidably received within the other member and extending from an end of the other member to engage said retractable room, said linkage means including a lever pivotally mounted on said one member at a first pivot and connected to a linkage via a second pivot, said linkage engaging said riser mechanism for operating the latter, said other member preventing pivoting of said lever until said lever passes said end as the one member extends from the other member as the retractable room is extended, whereupon said lever pivots around said first pivot to operate said linkage means.

14. Mobile living quarters as claimed in claim 13, wherein said riser mechanism is a plate mounted on said movable floor, said plate having an obliquely extending slot extending obliquely with respect to the linkage means, said one end of said elongated member carrying a follower engaging said obliquely extending slot.

15. Mobile living quarters as claimed in claim 13, wherein said riser mechanism is mounted for movement with the walls of the retractable room and defines a bore slidably receiving a connector connected to said movable floor and guiding said connector for movement in a generally vertical direction.

16. Mobile living quarters as claimed in claim 13, wherein said linkage includes an elongated member connected to said riser mechanism such that the elongated member moves relative to said one member to thereby raise and lower said movable floor in response to operation of the linkage means.

17. Mobile living quarters comprising a frame, a main floor supported by said frame, means extending from said main floor to define with said main floor a main living area, a retractable room mounted for movement from a retracted position within the main living area to an extended position extended from said main living area to provide an auxiliary living area, said retractable room having walls and a movable floor movable along said main floor with the walls, from a sliding position sliding upon said main floor to a flush position substantially flush with said main floor when the retractable room is in the extended position, retractable room support means mounted on said frame and engaging said retractable room to guide the latter for movement relative to said frame, said retractable room support means includes a pair of coaxial, relatively movable tubular members, linkage means operated by said retractable room support means and a riser mechanism mounted for movement with the retractable room for controlling movement of said movable floor relative to said main floor, said linkage means including an elongated member having one end engaging said riser mechanism and an opposite end having a lever actuator for moving said elongated member relative to said riser mechanism, said linkage means further including a camming surface mounted on said retractable room support means and a cam follower engaging said camming surface as the floor is lowered into said flush position, said linkage means engaging said riser mechanism through a sliding connection to move said movable floor into said flush position as said retractable room is moved into said extended position, said lever actuator being mounted for sliding and pivotal movement relative to said tubular members, said tubular members including an axial extending slot and a track extending parallel to said slot, said linkage means including an elongated member pivotally connected to said lever actuator and including a portion extending through said slot, said follower being mounted on said portion, and a roller mounted on said portion and rolling along said track as the movable floor moves along said main floor.

* * * * *